United States Patent Office 3,207,910
Patented Sept. 21, 1965

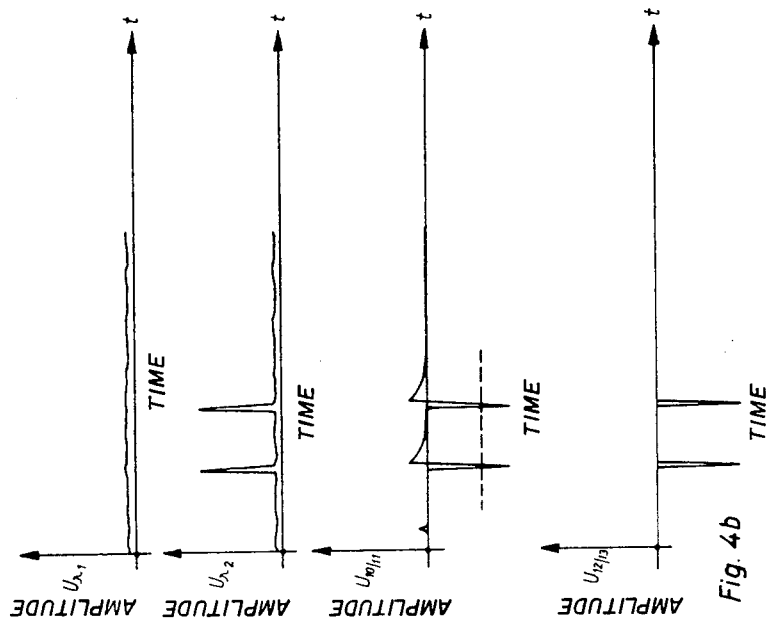
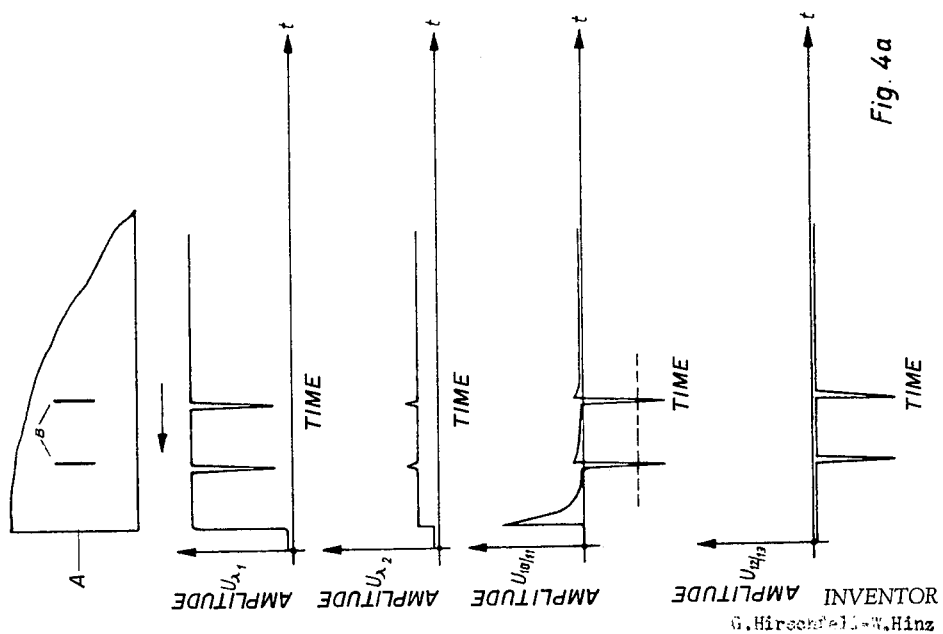

3,207,910
PHOTOSENSITIVE ARRANGEMENT FOR SCANNING FLUORESCING IDENTIFICATIONS
Gerhard Hirschfeld, Berlin, and Werner Hinz, Berlin-Neukolln, Germany, assignors to International Standard Electric Corporation, New York, N.Y., a corporation of Delaware
Filed Mar. 1, 1960, Ser. No. 12,098
Claims priority, application Germany, Mar. 12, 1959, St 14,879
7 Claims. (Cl. 250—226)

This invention relates to an arrangement for identifying articles to be sorted and, more particularly, to means for sensing fluorescent markings on articles.

In present sorting systems it is well known to identify articles by affixing markings to the articles which will fluoresce when excited by a specific source of energy such as ultraviolet light. In scanning certain articles, such as mail envelopes, it has been found that various types of white letter envelopes will fluoresce themselves due to their brightness or the application of bleaches and/or fluorescent substances during manufacture.

It is an object of this invention to provide an arrangement by which the fluorescent markings on articles which themselves are fluorescent may be scanned for identifying and/or sorting the articles.

A feature of our invention is the provision of means for separating two mutually exclusive bands of wavelengths from the wavelengths which emanate from a portion of the scanned articles due to excitation of that portion. One bandwidth contains the frequencies of the fluorescence which is primarily due to the article itself and the other bandwidth contains the frequencies of the fluorescence which is primarily due to the identification markings. Each of these two bandwidths is applied to a separate photocell. The output voltage of the photocells is applied to a device which produces a signal for each identifying mark scanned on the article.

In accordance with a preferred embodiment of our invention we employ monochromatic interference filters to separate the fluorescence into very narrow bands of wavelengths. These filters provide a selective reflection due to interference. They utilize the formation of so-called "colors of thin foils" and consist of thin layers evaporated in a vacuum onto a glass substrate. The thickness of these layers is in the order of magnitude of the optical wavelengths. These filters allow a high intensity of the radiation due to the nonreflected bandwidths to pass.

In one embodiment of our invention we employ these filters as mirrors. In the light reflected by the filters, narrow ranges or regions of wavelengths are missing at those points of the spectum where the filters have their bandpass points. The remaining wavelengths are reflected with a very high yield by way of a double reflection by two of these filters. It is possible with this arrangement to practically remove certain wavelengths from the spectrum of the light source. We retain the bands of wavelengths we are particularly interested in, that is, the band of wavelengths which is peculiar to fluorescent due to the articles to be sorted and the band of wavelengths due to the identifying markings thereon.

The above-mentioned and other features and objects of this invention will become more apparent by reference to the following description taken in conjunction with the accompanying drawings, in which:

FIG. 4a and FIG. 4b show voltage diagrams relating to the voltage values at the individual elements of the circuit arrangements according to FIG. 3.

Figure 1:
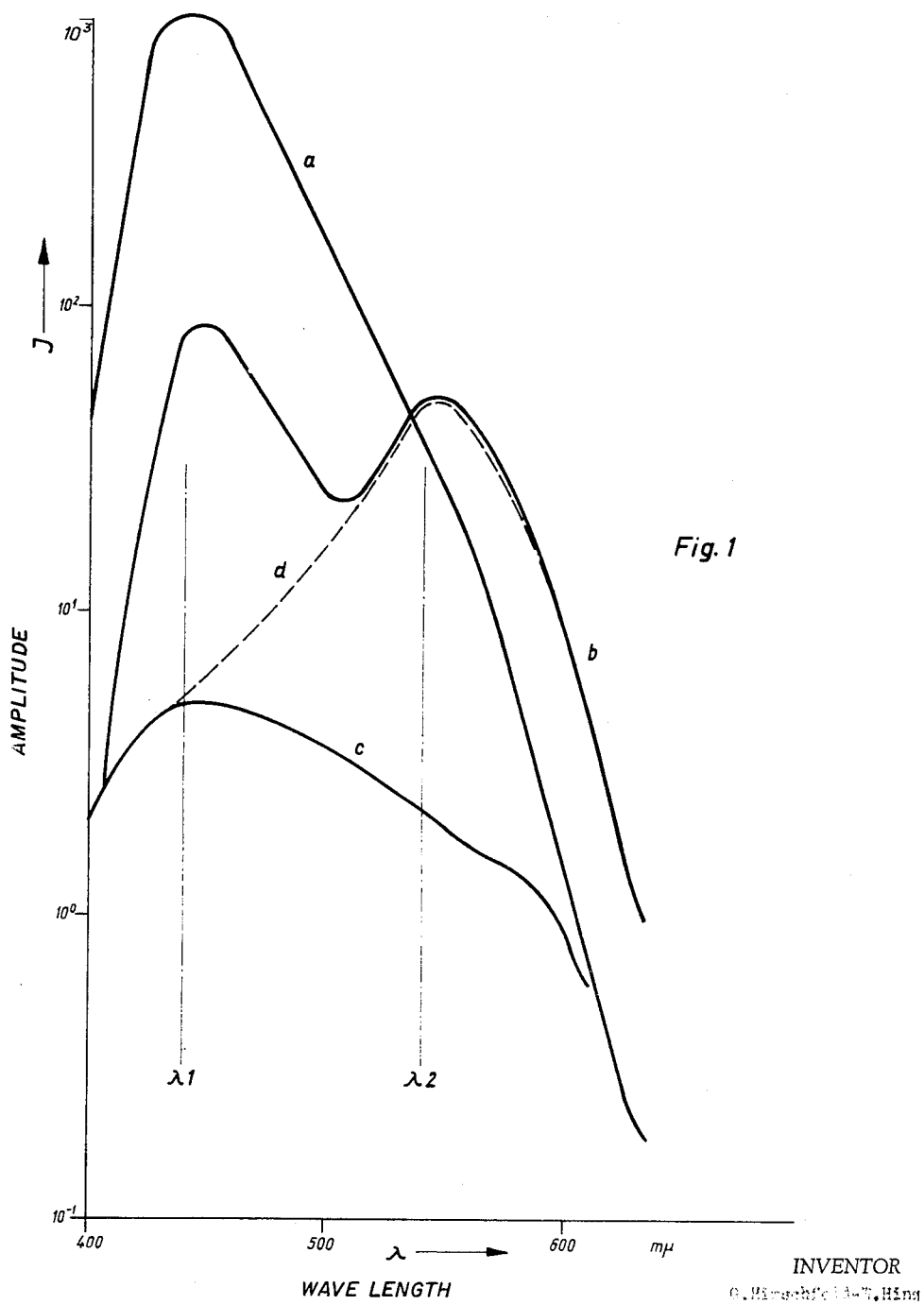
FIG. 1 shows a diagram with the amplitudes and the corresponding wavelengths of the radiations appearing in the course of the scanning operation.

In FIG. 1 the radiation intensity is plotted in the ordinate, and the wavelength of the radiation is plotted in the abscissa. The scale in the ordinate is logarithmic, and that of the abscissa is linear. The intensity distribution of the fluorescence spectrum of a paper bleached with a fluorescent material is indicated by the curve $a$. Curve $b$ shows the distribution of the fluorescence spectrum of an identification attached to such a prepared paper. Curve $c$ indicates the distribution in the case of a non-fluorescing paper, and curve $d$ corresponds to the fluorescence of an identification on such a paper which does not fluoresce itself.

It will be easily seen from the drawing that the maximum of curve $a$ lies at a wavelength $\lambda_1$ of 440 m$\mu$. Curve $b$ shows two maxima, the first of which is produced by the fluorescence of the paper, but lies below that of curve $a$ at $\lambda_1$. The second maximum is due to the fluorescence of the material applied as the identification, and lies at $\lambda_2 = 540$ m$\mu$. Curve $c$ does not show a distinct maximum, and has values lying far below both the maxima of curves $a$ and $b$. The maximum of curve $d$ is common to that of the curve $b$, however, curve $d$ has no maximum at $\lambda_1$.

Figure 2:
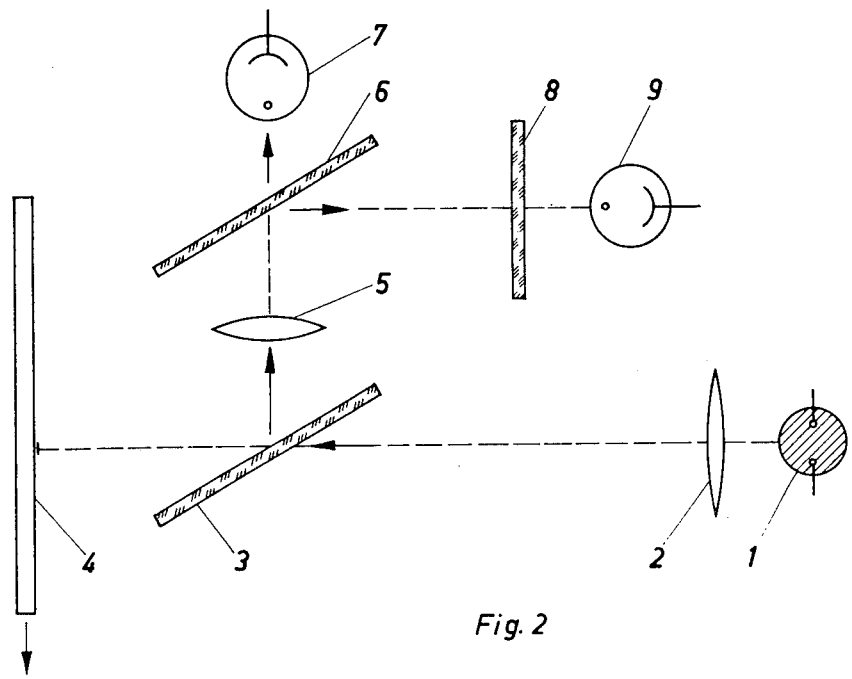
FIG. 2 shows a schematic representation of the arrangement of light sources, filters, and photocells and optical devices with respect to one another and to the article to be scanned.

An optical device adapted to solve the problem on which the invention is based is schematically shown in FIG. 2. The article 4 to be scanned is illuminated by a quartz lamp 1 via an optical system 2 and an inclined filter 3. The pass range of the filter is below 400 m$\mu$. Accordingly, the rays which serve to stimulate the fluorescence are easily permitted to pass through the filter, but the fluorescing rays stimulated by the light of the quartz lamp 1 and lying within the range of 400–600 m$\mu$ are not permitted to pass through the filter 3, but are reflected thereby. Owing to the inclined position of the filter 3 they are reflected via an optical system 5 to a further filter 6. This filter 6 is likewise inclined towards the direction of radiation. This filter has a pass range of 520–550 m$\mu$, which corresponds to the wavelength of the fluorescing rays of the identification ($\lambda_2$ in FIG. 1). The wavelengths lying below 520 m$\mu$ are not permitted to pass, and are reflected. Accordingly, only rays of higher wavelengths pass through the filter 6, that is, rays which range between 520 and 550 m$\mu$, and impinge upon the photocell 7 arranged behind the filter 6. The reflected rays, however, meet upon a filter 8 with a medium pass range of 440 m$\mu$ ($\lambda_1$ in FIG. 1), and those rays within the pass range of filter 8 reach photocell 9.

Figure 3:
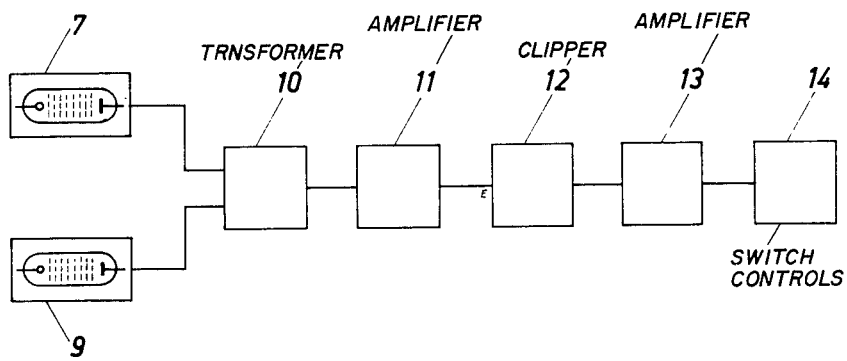
FIG. 3 shows a basic circuit diagram relating to the evaluation of the electric signals appearing in or produced by the photocells.

The block diagram of the electrical arrangement is shown in FIG. 3. The photocells 7 and 9 are appropriately electron multipliers, the outputs of which are respectively applied to one end of the primary winding of a transformer 10 in order to form the difference. The secondary winding of the transformer feeds an amplifier 11 which is so designed and dimensioned that it only amplifies the voltage peaks with the polarity of the identification, and transfers them to the clipper or amplitude filter 12. Amplitude filter 12 produces an output only when the input peaks exceed a critical value so that only positive and negative peaks exceeding the critical value are compared for a more critical evalution of the pulses. It can be seen that the evaluation is more critical when noting that the differences in amplitude between two pulses may be of the order of 5% whereas the difference in amplitudes between the clipped-off peaks may be in the order of 50%. A specific example of clipping circuits for passing only pulses exceeding a positive or negative amplitude which utilizes parallel-diode limiters which pass peaks only is shown in FIGURE 170 on page 162 of "Radar Electronic Fundamentals," Navships 900,016, Bureau of Ships, Navy Department, June 1944. After a further amplification effected by the amplifier 13, the filtered voltage peaks are applied to an electromagnetic control device 14. This device 14 is adapted to actuate switch-over elements of the conveying system through which the letter or card to be scanned is fed to a bin or container corresponding to the identification attached to the letter or card, etc.

In the arrangement according to the invention, in the course of scanning an object which is continuously passed through the rays of the light source, and carries fluorescing identifications, the voltage curves as shown in FIGS. 4a or 4b will result on the photocells, depending on whether the surfaces of the objects themselves are fluorescent or not. The amplitude is plotted in the ordinate and the time is plotted in the abscissa.

A letter to be scanned is indicated by the reference A. On its right-hand lower edge this letter carries the identifications B. The path of rays of the light source is indicated by the reference C. The letter is assumed to be moved from right to left, so that successively the surface, the first identification B, then again the surface, and thereupon a further identification B pass through the path of rays. If the surface fluoresces, and approaches the path of rays, then the corresponding photocell is acted upon, which causes an increase of the photocell current. This value of the photo current is equally maintained during the entire passage of the letter B through the path of rays C, provided that no other characters or identifications are applied to the letter. However, the identifications B effect a dropping of the intensity to a predetermined value. The photocell for $\lambda_2$, however, shows a constant value, which is only subjected to slight increases at the points of the identifications. If now the voltages of both outputs of the photocells are applied to a transformer 10 then the edge of the letter effects a considerable increase and an immediately following dropping of the current on the secondary winding. The identifications, however, produce negative impulses which, as soon as they have passed the amplitude filter, produce two criterions which are sufficient to control a conveying system after having been correspondingly amplified.

However, if the letter envelope A does not fluoresce then, as shown in FIG. B, no current will appear at the photocell for $\lambda_1$. At the photocell for $\lambda_2$, however, the identifications effect a considerable increase and decrease of the photo current. The difference between the photocell voltage $U_1$ and $U_2$ results in a negative sequence of impulses at the output of the transformer as shown in FIG. 4b. This negative train of pulses produces at the output of the amplitude filter practically the same values as the identifications in the case of FIG. 4a.

For the sorting of the letters, cards, or similar objects or articles, a conveying system is used by means of which these articles are led past a point which is acted upon by the light source 1, and where the scanning is effected by means of the optical device described hereinbefore. For distinguishing between the objects or articles vertical marks of a fluorescent material are applied to the letters or cards. The number of articles and the spacings among each other provide the sorting criterion which can be determined by a special evaluation circuit and which, in special cases, and after a corresponding storing, is used to control the conveying path of the conveying system. In this way the letters, cards, etc. can be provided with identifications corresponding to their respective destinations.

In a similar way the inventive arrangement can also be used for letter-facing purposes with respect to the individual dispatch articles. To this end postage stamps are used containing a fluorescent substance. The position of the postage stamps is determined by a subsequently following arrangement which, however, does not form part of the subject matter of the present invention. By way of reversing paths the dispatch articles are treated in such a way that they, at the output of the system, assume a uniform position with respect to the viewing person. Thereupon the sorting according to destinations can be carried out as mentioned hereinbefore. In order that the letter facing operations do not affect the scanning device of our sorting system, the identification markings can be applied to the bottom edge of the articles and/or the postage stamp can be covered up before scanning.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. Apparatus for identifying articles which will predominately fluoresce at frequencies having wavelengths approximating 440 milli-microns, according to preapplied fluorescent marks by scanning the marks which are affixed to the articles wherein said marks which fluoresce to emit light in the range of 520 to 550 milli-microns in wavelength comprising a source of light energy which causes portions of said article to fluoresce, a first filter disposed between said light source and said article, said filter passing light having a wavelength less than 400 milli-microns in wavelength and reflecting all other wavelengths of light, said filter being disposed at an angle to the surface of said article to be identified whereby fluorescent light emitted by said article impinges on the surface of said filter and the light component which is less than 400 milli-microns in wavelength passes through said filter and the light component which is greater than 400 milli-microns in wavelength is reflected, a second filter disposed in optical relationship with said first filter having a pass range between 520 and 550 milli-microns in wavelength corresponding to the wavelength of the identifying marks whereby light reflected by said first filter which falls within the pass range of said second filter passes therethrough and light of other wavelengths is reflected therefrom, a third filter having a minimum pass range of 440 milli-microns wavelength of light and disposed in optical relationship to said second filter whereby light reflected from said second filter having a minimum pass range of 440 milli-microns passes through said third filter, a first photocell disposed with relation to said second filter so as to be activated by light passing therethrough which light corresponds to the light emitted by said identifying marks, a second photocell disposed with relation to said third filter so as to be activated by light passing therethrough, which light corresponds to light emitted by said article, means to compare the output of said first and second photocells, and means responsive to said comparison means for identifying said articles according to the fluorescent marks affixed to each.

2. Apparatus for scanning articles which will predominately fluoresce at frequencies within a first bandwidth of frequencies when excited for identification markings which will predominately fluoresce at frequencies within a second bandwidth of frequencies exclusive of said first bandwidth of frequencies comprising: means for exciting a portion of the scanned articles including said identification markings so that the excited portion including said identification markings will fluoresce, means for separating both said first and second bandwidths of frequencies from the frequencies of fluorescence due to said excitation, and means responsive to the amount of fluorescence within said first and second bandwidths for indicating when an identification marking is present.

3. Apparatus for scanning articles which will predominately fluoresce at frequencies within a first bandwidth of frequencies when excited for identification markings which will predominately fluoresce at frequencies within a second bandwidth of frequencies exclusive of said first bandwidth of frequencies comprising: means for exciting a portion of the scanned articles including said identification markings so that the excited portions including said identification markings will fluoresce, first means for separating said first bandwidth of frequencies from the frequencies of fluorescence due to said excitation, second means for separating said second bandwidth of frequencies from the fluorescence due to said excitation, and means cooperating with said first and second separating means responsive to the amount of fluorescence within said first and second bandwidths for indicating when an identification marking is within said excited portion.

4. Apparatus according to claim 3 wherein each said separating means comprises at least one monochromatic interference filter.

5. Apparatus according to claim 3 wherein said first bandwidth includes frequencies having wavelengths of approximately 440 milli-microns and said second bandwidth includes frequencies having wavelengths within the range of 520–550 milli-microns.

6. Apparatus according to claim 3 wherein said first separating means comprises a monochromatic interference filter which will pass frequencies having wavelengths approximating 440 milli-microns and said second separating means comprises a monochromatic interference filter which will pass frequencies having wavelengths between 520–550 milli-microns.

7. Apparatus according to claim 6 wherein said cooperating means comprises photoelectric cells and a transformer, the outputs of said photoelectric cells being coupled to the primary winding of said transformer.

References Cited by the Examiner

UNITED STATES PATENTS

| | | | |
|---|---|---|---|
| 2,593,206 | 4/52 | Short | 250—219 |
| 2,742,631 | 4/56 | Rajchman et al. | 340—173 |
| 2,840,146 | 6/58 | Ray | 250—226 X |
| 2,856,811 | 10/58 | Kaye | 250—226 X |
| 2,936,886 | 5/60 | Harmon | 250—219 |
| 2,950,799 | 8/60 | Timms | 250—219 |

FOREIGN PATENTS 686,642  1/53  Great Britain.

RALPH G. NILSON, *Primary Examiner.*

RICHARD M. WOOD, WALTER STOLWEIN,
*Examiners.*